United States Patent
Bonnis

(10) Patent No.: US 7,337,710 B2
(45) Date of Patent: Mar. 4, 2008

(54) APPARATUS FOR STORING CREPES

(75) Inventor: Kyriakos K. Bonnis, Vancouver (CA)

(73) Assignee: Cafe Crepe, Inc., Vancouver, British Columbia ( * ) Notice: Subject to any disclaimer, the term of this patent is extended or adjusted under 35 U.S.C. 154(b) by 49 days.

(21) Appl. No.: 10/903,729

(22) Filed: Jul. 29, 2004

(65) Prior Publication Data

US 2006/0016349 A1   Jan. 26, 2006

(30) Foreign Application Priority Data

Jul. 23, 2004   (CA) ................................ 2475742

(51) Int. Cl.
    *A47J 27/00*  (2006.01)
(52) U.S. Cl. .......................... 99/467; 99/450
(58) Field of Classification Search ......... 99/444–450, 99/400, 401, 483, 467; 126/9 R, 25 R, 41 R
    See application file for complete search history.

(56) References Cited

U.S. PATENT DOCUMENTS

| | | | |
|---|---|---|---|
| 3,224,357 A * | 12/1965 | Rubens | ........................ 99/340 |
| 4,006,676 A | 2/1977 | Adamis | |
| D245,059 S | 7/1977 | Bardin | |
| D246,025 S | 10/1977 | Gooden | |
| 4,063,497 A | 12/1977 | Thompson | |
| 4,083,296 A | 4/1978 | Mede et al. | |
| D248,207 S | 6/1978 | Madl | |
| D248,362 S | 7/1978 | Bluestein | |
| D253,510 S | 11/1979 | Bardin | |
| 4,195,560 A | 4/1980 | DuBois et al. | |
| 4,280,402 A | 7/1981 | Featherstone | |
| 4,285,653 A | 8/1981 | Bronnec | |
| 4,321,858 A | 3/1982 | Williams | |
| 4,439,124 A | 3/1984 | Watanabe | |
| 4,585,124 A | 4/1986 | Pride | |
| 4,857,354 A | 8/1989 | Ishida et al. | |
| 4,962,696 A * | 10/1990 | Gillis | ........................ 99/340 |
| 5,586,805 A * | 12/1996 | Rinehart | ................. 297/188.09 |
| 6,016,797 A * | 1/2000 | Nowicke, Jr. | ............. 126/25 R |
| 6,123,015 A * | 9/2000 | McLain et al. | ................ 99/449 |

* cited by examiner

*Primary Examiner*—Timothy F. Simone
(74) *Attorney, Agent, or Firm*—Thelen Reid Brown Raysman & Steiner LLP

(57) ABSTRACT

A apparatus for storing crepes, comprising a semi circular cylinder having an open bottom and top, said cylinder shaped to fit around a crepe; a perforated surface that fits into and is raised above a pan shaped to receive said semi-circular cylinder and hold it in a position; a cover shaped to receive said top of said semi circular cylinder; and wherein said cylinder is sized to surround said crepe without contact therewith.

7 Claims, 4 Drawing Sheets

APPARATUS FOR STORING CREPES

CROSS-RELATED APPLICATIONS

The present application claims priority from Canadian Patent Application Ser. No. 2,475,742, filed Jul. 23, 2004, entitled "Apparatus for Storing Crepes".

BACKGROUND OF THE INVENTION

1. Field of the Invention

This invention relates to food storage apparatuses, and more particularly to apparatuses for storing crepes.

2. Description of the Prior Art

In a typical establishment serving crepes, the crepes are usually made on demand for immediate consumption by customers. In such a case the crepe will be fresh when received by the customer, and will taste accordingly, however, it may be difficult for a kitchen to prepare for a "rush" of orders, for example during lunch or another busy period.

In other circumstances, the crepes are stored on open surfaces. In this situation, the stored crepes will quickly dry out, and even harden. As a result, while it is then possible to have a number of crepes ready to meet the needs of a busy period, such crepes may be of very poor quality.

Another method of storing crepes is to store them in a sealed container made of plastic or metal. While such storage methods prevent the crepes from drying out, as the warm crepes cause condensation, the inner surface of such container has a tendency to attract the condensed water, which is then passed to the crepes. Thus crepes stored in such containers tend to become damp and are of poor quality when served.

What is needed is an apparatus to allow storage of crepes to meet needs of customers during a busy period, such that the crepes are kept warm but not overly dried out or dampened.

BRIEF SUMMARY OF THE INVENTION

A apparatus for storing crepes is provided, comprising a semi circular cylinder having an open bottom and top, said cylinder shaped to fit around a crepe; a perforated surface shaped to receive said semi-circular cylinder and hold it in a position; a cover shaped to receive said top of said semi circular cylinder; and wherein said cylinder is sized to surround said crepe without contact therewith.

The apparatus may further comprise a pan for receiving said perforated surface. The perforated surface may include a lip for placement on said pan whereby said perforated surface is maintained at a distance from a surface on said pan. The pan may further comprise a handle and the cover may comprise a second handle.

The cylinder may be sized to fit around a plurality of crepes in a stack, and such stack may form a generally semi-circular cylindrical shape.

DETAILED DESCRIPTION OF THE INVENTION

Figure 1:
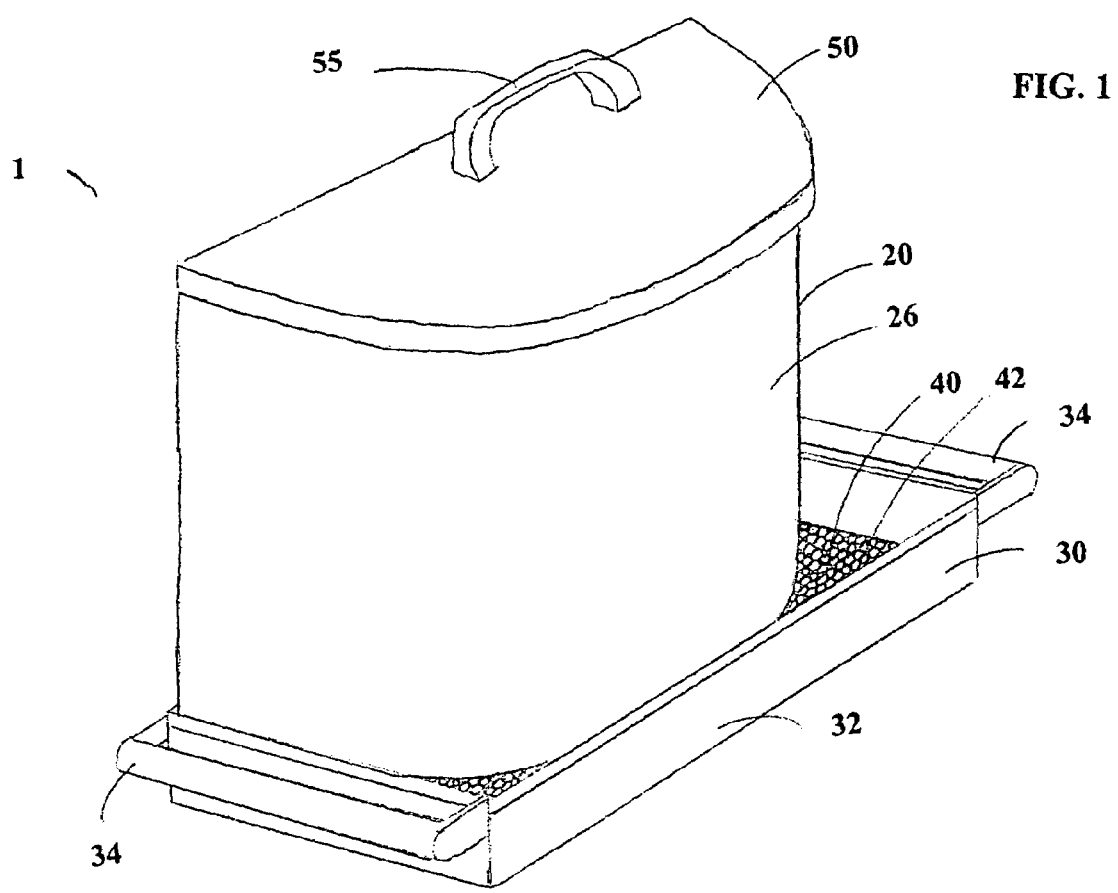
FIG. 1 is a perspective view of an apparatus according to the invention.
Figure 2:
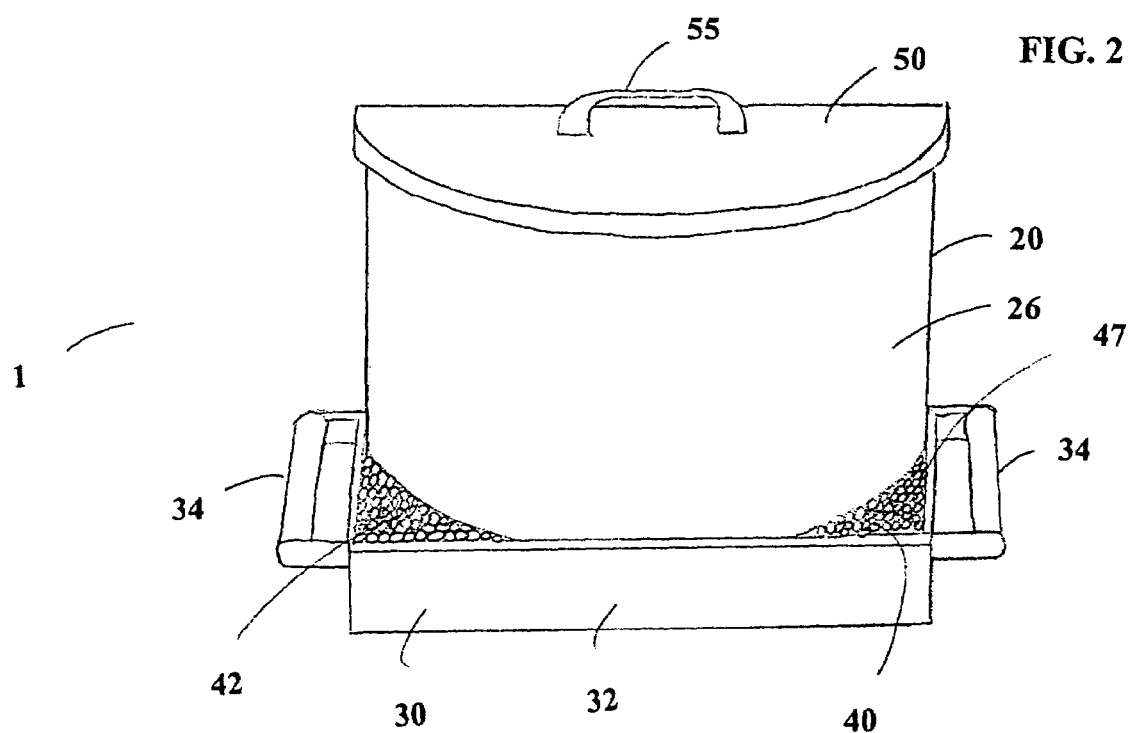
FIG. 2 is a front view thereof.
Figure 3:
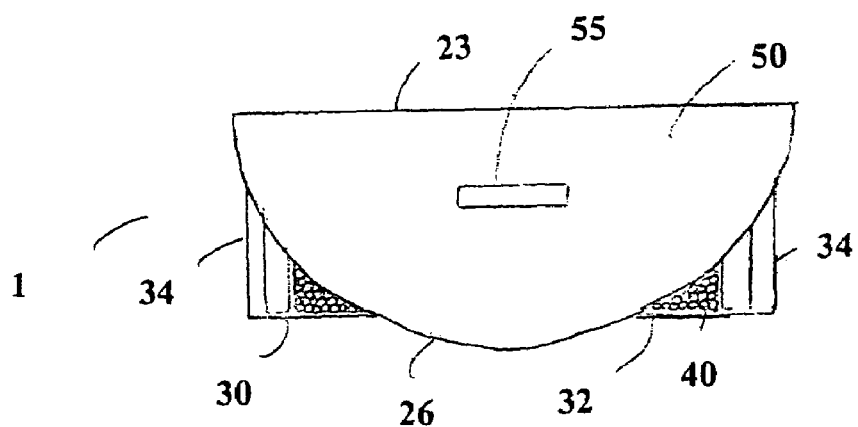
FIG. 3 is a top view thereof.

As seen in FIGS. 1 through 3, apparatus for storing crepes 1 comprises a semi circular cylinder 20, a pan 30, a perforated surface 40, and a cover 50.

Figure 7:
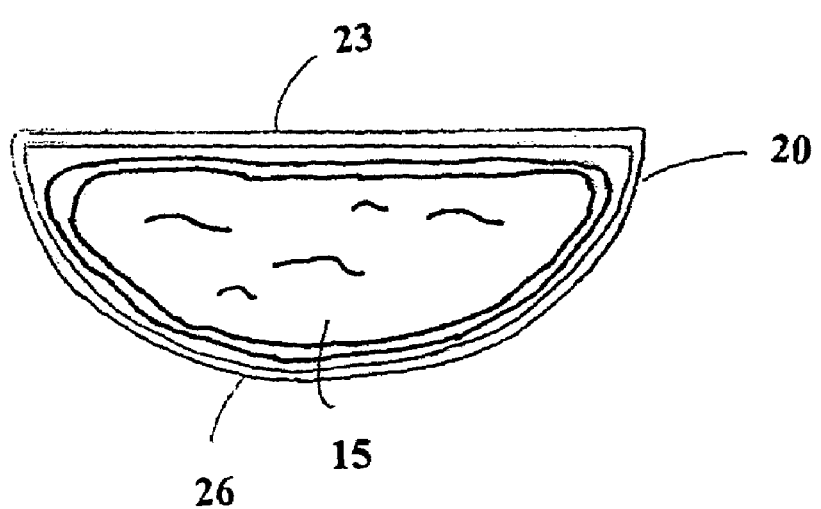
FIG. 7 is a top view of the semi-circular cylinder thereof, surrounding a stack of crepes.

Semi circular cylinder 20, as seen in FIG. 7 is a hollow cylinder in the shape of a semi circle. Cylinder 20 has a flat edge 23 and a curved outer surface 26. Cylinder 20 is shaped to surround a plurality of crepes. Crepes are generally circular in shape, but can be folded over to form a semi circle. They can then be vertically stacked to form a semi-circular cylindrical shape. Cylinder 20 is sized to fit over the vertically stacked crepes 15 with some clearance or distance from the edge of the stacked crepes to the edge of cylinder 20. In other words, the crepes should not be in contact with cylinder 20. Cylinder 20 is preferably made of metal or another insulating material to help retain heat, moisture and hygienic qualities for proper food safety handling.

While cylinder 20 in the preferred embodiment is shown as semi-circular, as such a shape conforms to the shape of the crepes, other cylinders could be used. For example the crepes could be folded into quarter circles, in which case cylinder 20 would have a similar "pie slice" shape. Likewise, the crepes could be folded into squares or rectangles, in which case cylinder 20 could be correspondingly shaped.

Figure 5:
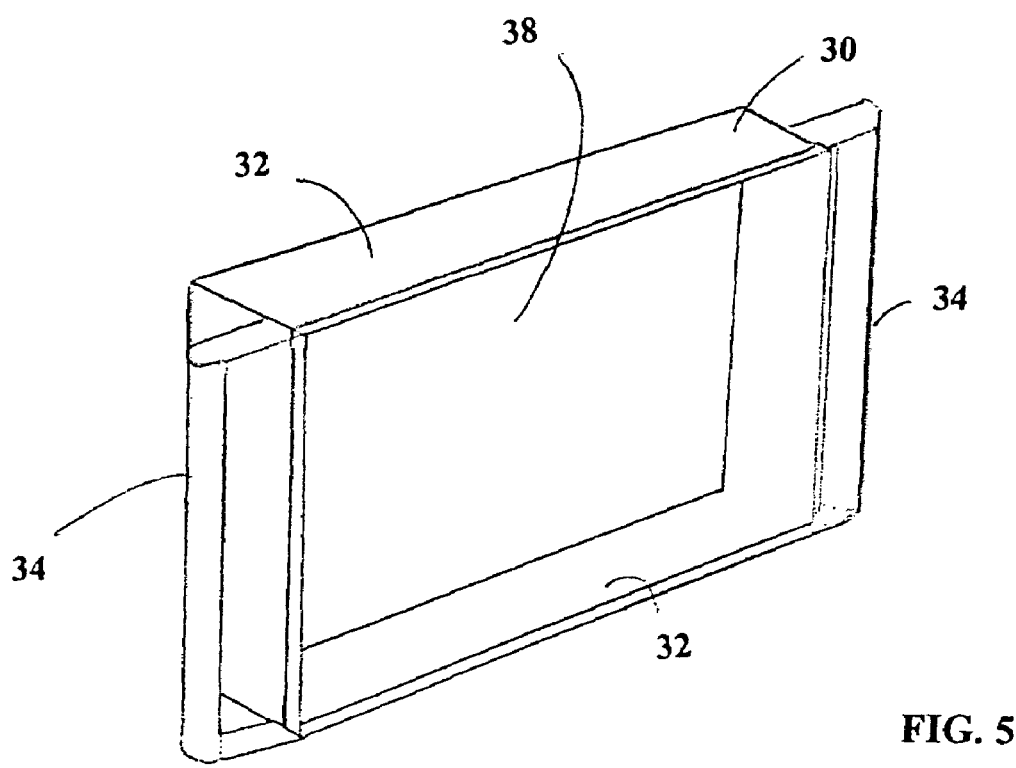
FIG. 5 is a perspective view of the pan thereof.

As seen in FIG. 5, pan 30 preferably has a rectangular shaped surface 38 to receive perforated surface 40. Pan 30 is surrounded by lip 32 and has handles 34 at either end for transporting apparatus 1. Pan 30 is also sized to conform to and hold cylinder 20 so as to restrict the movement of cylinder 20, and prevent cylinder 20 from coming into contact with the stack of crepes.

Pan 30 is sized to hold perforated surface 40 and cylinder 20 snugly, and prevent each from moving. Of course it need not be rectangular, for example a semi circular shape would suffice.

Figure 4:
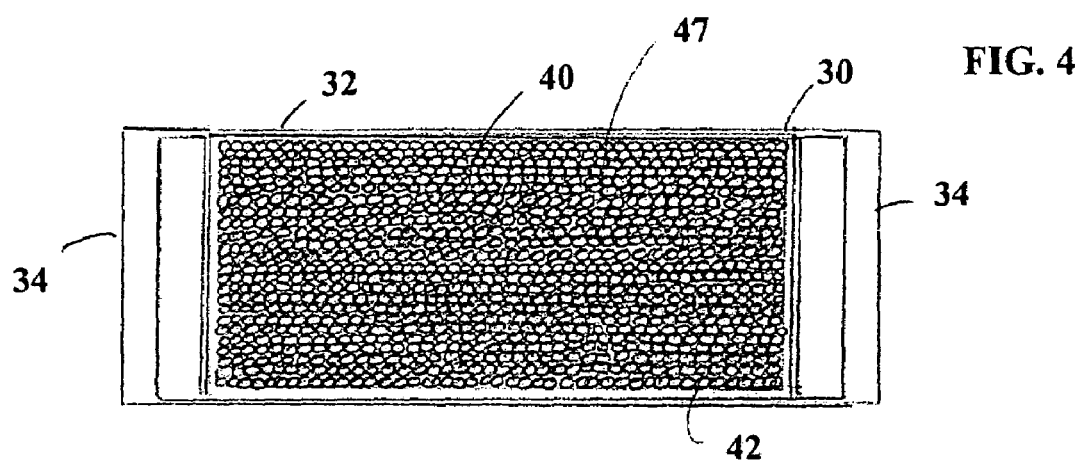
FIG. 4 is a top view of the pan and perforated surface thereof.
Figure 6:
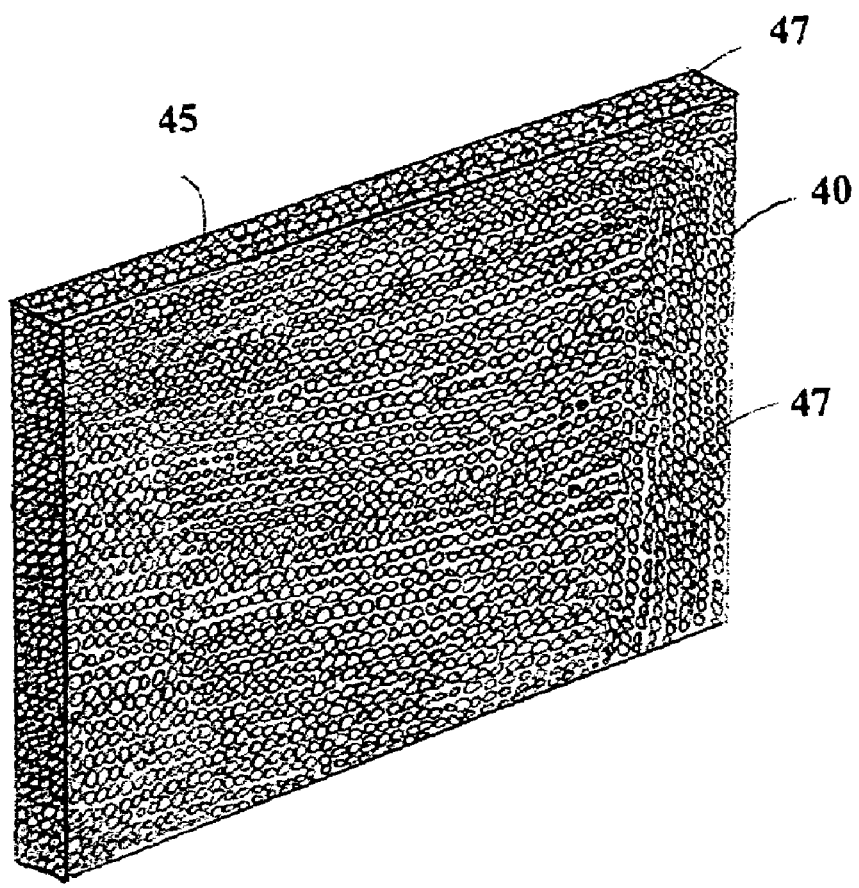
FIG. 6 is a perspective view of the perforated surface thereof.

As seen in FIGS. 4 and 6, perforated surface 40 is shaped to fit into pan 30. Perforated surface 40 is placed in pan 30 such that lip 45 is in contact with surface 38 of pan 30. Therefore lip 45 raises perforated surface 40 such that flat plane 42 of perforated surface, when placed in pan 30, is elevated. Perforated surface 40 is perforated by a plurality of apertures 47. Apertures 47 should be positioned to allow water flowing from the edges of cylinder 20 due to condensation to pass through perforated surface 40 and into pan 30. Therefore, apertures 47 can be positioned throughout surface 40 as seen in the Figures, or may be positioned more sparingly, for example around where the edges of cylinder 20 contact surface 40. Apertures 47 may also be in a variety of shapes and sizes.

Cover 50 is shaped to fit snugly over cylinder 20 to retain heat. Handle 55 is positioned on cover 50 for ease of removal thereof.

In use, perforated surface 40 is positioned on pan 30, preferably close to where the crepes are being prepared. Perforated surface 40 is positioned such that lip 45 is on the surface of pan 30 thus creating a distance between the surface of pan 30 and apertures 47.

The crepes are then "filled" and folded to form a semi circular shape and stacked on perforated surface 40 accordingly to form a semi circular cylinder shape. Then cylinder 20 is placed on perforated surface 40 over the stack of crepes such that the cylinder 20 does not come into contact with the crepes. Alternatively, cylinder 20 can be positioned on perforated surface 40 prior to the stack of crepes being prepared, and instead the crepes can be placed in cylinder 20 as they are prepared. Cover 50 is then placed on cylinder 20.

The apparatus 1 preserves the freshness of the crepes. Condensation from the crepes will accumulate on the sides of cylinder 20 and will flow to perforated surface 40, through apertures 47 and onto the surface of pan 30. Therefore the crepes can maintain freshness without drying out or becoming overly moist.

Although the particular preferred embodiments of the invention have been disclosed in detail for illustrative purposes, it will be recognized that variations or modifications of the disclosed apparatus lie within the scope of the present invention.

The invention claimed is:

1. An apparatus for storing crepes, comprising,
    a hollow semi circular cylinder, said cylinder shaped to fit around a heated crepe;
    a perforated surface shaped to receive said semi-circular cylinder and hold said cylinder thereon;
    a cover shaped to fit on a top of said semi circular cylinder;
    a rectangular pan shaped to receive and hold said perforated surface therein, wherein when condensation from said heated crepe accumulates in said enclosure, said condensation flows through said perforated surface to said pan.

2. The apparatus of claim 1 wherein said perforated surface includes a lip for placement on said pan whereby said perforated surface is maintained at a distance from a surface of said pan.

3. The apparatus of claim 2 wherein said pan further comprises a handle.

4. The apparatus of claim 3 wherein said cover comprises a second handle.

5. The apparatus of claim 1 wherein said cylinder is configured to fit around a plurality of crepes in a stack.

6. The apparatus of claim 5 wherein said stack forms a generally semi-circular cylindrical shape.

7. An apparatus for storing crepes, comprising,
    a hollow semi circular cylinder shaped to fit around a crepe;
    a perforated surface shaped to receive said semi-circular cylinder and hold said cylinder thereon;
    a cover shaped to fit on a top of said semi circular cylinder;
    a pan shaped to receive and hold said perforated surface therein, wherein a portion of said perforated surface in said pan is exposed between an outer surface of said circular cylinder and an inner surface of said pan, wherein condensation from said crepe accumulates within said enclosure and flows downward from within said enclosure to said perforated surface.

* * * * *